F. SMITH.
PARACHUTE.
APPLICATION FILED OCT. 22, 1920.
1,366,843.
Patented Jan. 25, 1921.
2 SHEETS—SHEET 1.
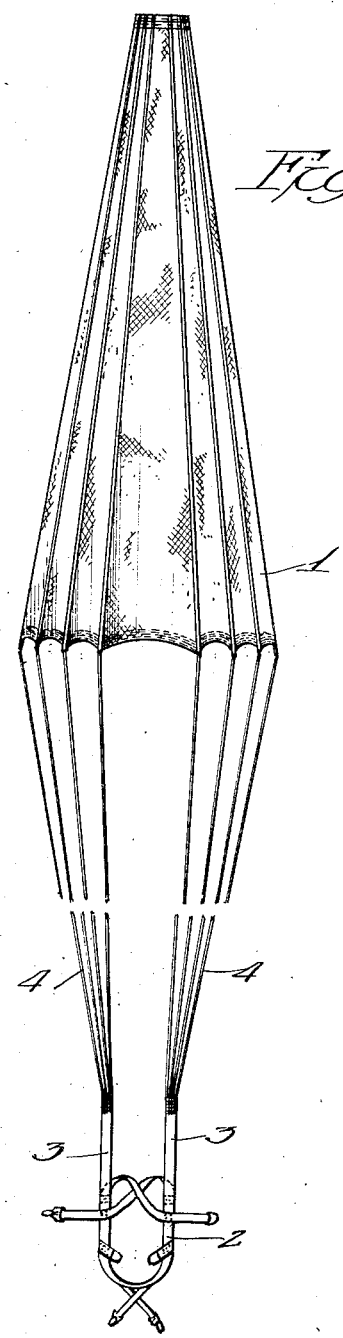
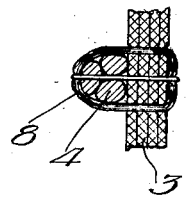
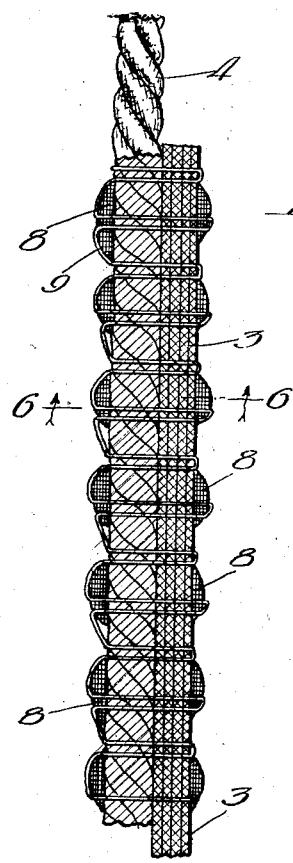
Inventor:
Floyd Smith
By Chamberlin & Brendenreich
Atty's

F. SMITH.
PARACHUTE.
APPLICATION FILED OCT. 22, 1920.

1,366,843.

Patented Jan. 25, 1921.
2 SHEETS—SHEET 2.

Inventor:
Floyd Smith
By Chamberlin & Brendenreich
Attys

UNITED STATES PATENT OFFICE.

FLOYD SMITH, OF SAN DIEGO, CALIFORNIA, ASSIGNOR TO FLOYD SMITH AERIAL EQUIPMENT COMPANY, A CORPORATION OF ILLINOIS.

PARACHUTE.

1,366,843.  Specification of Letters Patent.  Patented Jan. 25, 1921.

Application filed October 22, 1920. Serial No. 418,710.

*To all whom it may concern:*

Be it known that I, FLOYD SMITH, a citizen of the United States, and resident of San Diego, San Diego county, California, and temporarily residing at Chicago, county of Cook, State of Illinois, have invented certain new and useful Improvements in Parachutes, and declare the following to be a full, clear, and exact description of the same, such as will enable others skilled in the art to which it pertains to make and use the same, reference being had to the accompanying drawings, which form a part of this specification.

In the best type of parachute adapted for use in carrying human beings to safety the weight of the load first comes upon strong suspending straps and by these is transmitted through the shroud lines to the fabric of the parachute, the shroud lines extending to a ring at the apex. The shroud lines are quite numerous and therefore there are many points of attachment between them and the associated elements.

The object of the present invention is so to secure the shroud lines that the stresses during the use of the parachute will be most effectively distributed, a reduction in the number of parts forming the parachute will be obtained and, by reason of the rapidity with which the fastenings can be made, the expense of this step in the manufacture of parachutes will be greatly reduced.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is an elevation of a parachute embodying my invention, the parachute being only partly opened;

Fig. 5 is a section on an enlarged scale through one of the suspending straps on a plane containing the axis of one of the shroud line ends overlying the strap; and Fig. 6 is a section taken approximately on line 6—6 of Fig. 5.

Figure 3:
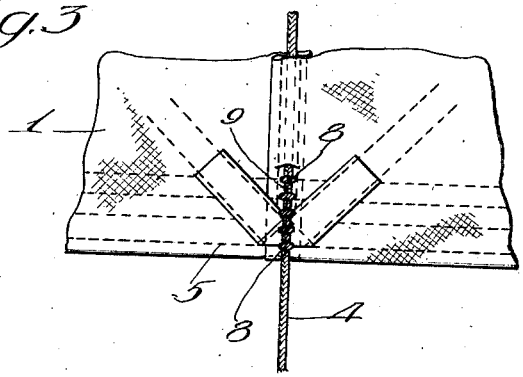
Fig. 3 is a view on the same scale as Fig. 1, of a fragment of the parachute in the vicinity of the marginal edge.
Figure 4:
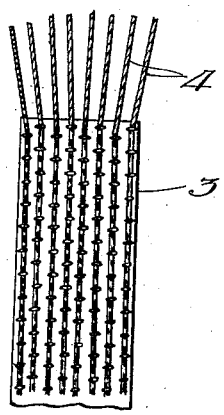
Fig. 4 is an elevation of the upper end of one of the suspending straps and fragments of a group of shroud lines fastened thereto.

Referring to the drawings, 1 represents the fabric of a parachute of any usual or suitable construction. 2 is a harness to be worn by a parachutist. 3, 3 are suspending straps leading upwardly from the harness and adapted to bear the weight of the parachutist during a descent. The suspending straps are connected to the body of the parachute by shroud lines, 4, the upper ends of which extend from the periphery of the body of the parachute radially toward the center or apex in much the same way as the ribs of an umbrella. The fabric has a reinforced margin along the peripheral edge, as indicated at 5. Each of the shroud lines is attached to this reinforced marginal portion as illustrated in Fig. 3 and from there continues to a suitable reinforced ring-like part, 6, at the center or apex where it is again securely fastened. The reinforcement at the center or apex may conveniently consist of an annular strip of tape or a plurality of concentric strips secured to the fabric of the parachute by lines of stitching as illustrated at 7.

In accordance with my invention I avoid the use of knots of any kind. Instead of using knots for fastening the shroud lines at any point, I make use of stitching, thus making it possible to employ machines whose work will be not only rapid but effective.

The manner of stitching the shroud lines to the suspending straps, to the reinforced peripheral margins of the body of the parachute, and to the reinforcing ring at the center or apex is the same and therefore a detailed description of the manner in which the shroud lines are fastened at one of these points will suffice.

In Figs. 5 and 6 I have illustrated in detail the manner in which a shroud line is fastened to one of the suspending straps. It will be seen that one end of the shroud line is laid flat against the strap so as to extend lengthwise of the same. The line is then tied in place by a series of groups of stitches, 8, each group passing around the shroud line and through the strap. In this way each shroud line is in effect tied to the strap at a considerable number of separated points without distorting the line further than such distortion as may be produced by the pressure of the threads which press it firmly against the strap. After the line has been tied in place it is sewed to the strap by means of a row of stitching, 9, extending throughout the length of the attached portion of the line and passing directly through the line and through the strap.

It will be seen that when the binding threads, 8, are placed in position the shroud line is simply held frictionally against the strap but, when the longitudinal row of stitching, 9, is applied, the result is that that portion of the shroud line in contact with the strap is sewed directly to the strap while that portion of the shroud line directly opposite that which touches the strap is sewed directly to the overlying group of threads, 8. At the same time those portions of the groups of binding threads, 9, lying on the opposite side of the strap from that on which the shroud lines are located are sewed directly to the strap at the points of contact therewith. The result is that when the weight of a parachutist comes upon the strap it is not transmitted only to those portions of the shroud lines that happen to be in contact with the strap, but the stresses are distributed more or less uniformly across the entire cross sectional areas of the shroud lines.

Figure 2:
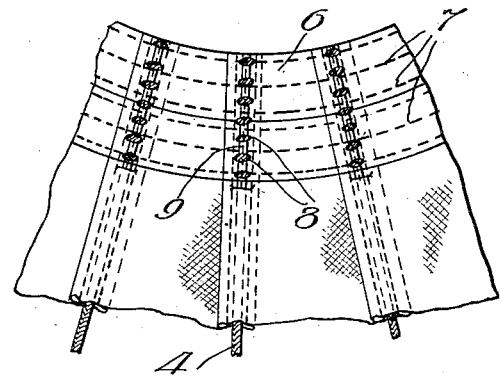
Fig. 2 is a view on a larger scale than Fig. 1, of a fragment of the parachute and shroud lines at the ring which forms the apex.

Each shroud line is fastened to the reinforced peripheral portion, 5, of the parachute fabric and to the reinforcing ring at the apex or center, as hereinbefore explained, in the same way as it is fastened to the suspending strap, namely by means of groups of tying threads or stitches and longitudinal rows of stitches, 9, as indicated at 8 in Figs. 3 and 2, respectively.

At each point of attachment of the shroud line, therefore, the fastening means are so disposed that they may be quickly and easily applied by machinery, leaving the parts in a condition which secures such a distribution of stresses that the full strength of each shroud line is utilized.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In combination, a line, a member against which the line lies, threads passing over said line and through said member so as to tie a considerable length of the line to said member, and a row of stitching running lengthwise of the line and passing through the same and the aforesaid threads and through said member.

2. In combination, a line, a member against which the line lies, a series of ties securing said line to said member at a plurality of distributed points, each tie consisting of a bundle of threads passing over said line and through said member, and a row of stitching running lengthwise of said line and passing through the ties, the line and said member.

3. In a parachute, a flat suspending strap, a plurality of shroud lines having end portions of considerable length lying against one of the broad faces of said strap, and threads passing over each of said end portions and through said strap to tie each of said lines to the strap at a plurality of points distributed along the line, and a row of stitching running lengthwise through each of said portions and through said threads and said straps.

4. In a parachute, a parachute fabric having a reinforced peripheral portion and a reinforced annular portion at the apex, flat suspending straps, shroud lines lying flat against said straps and extending radially of the parachute fabric across said reinforced portions, and stitching securing said lines to the straps and to each of said reinforced portions.

5. In a parachute, a parachute fabric, flat suspending straps, shroud lines, a portion of the shroud lines extending from the fabric to one of said straps and the remainder extending from the fabric to the other strap, each shroud line having an end portion of considerable length lying against one of the broad faces of the corresponding strap and secured to that strap by being sewed thereto.

6. In a parachute, a flat suspending strap, a plurality of shroud lines having end portions of considerable length lying against one of the broad faces of said strap, and threads passing over each of said end portions and through said strap to tie each of said lines to the strap at a plurality of points distributed along the line and independently of the other lines.

In testimony whereof I sign this specification.

FLOYD SMITH.